United States Patent Office 2,774,308
Patented Dec. 18, 1956

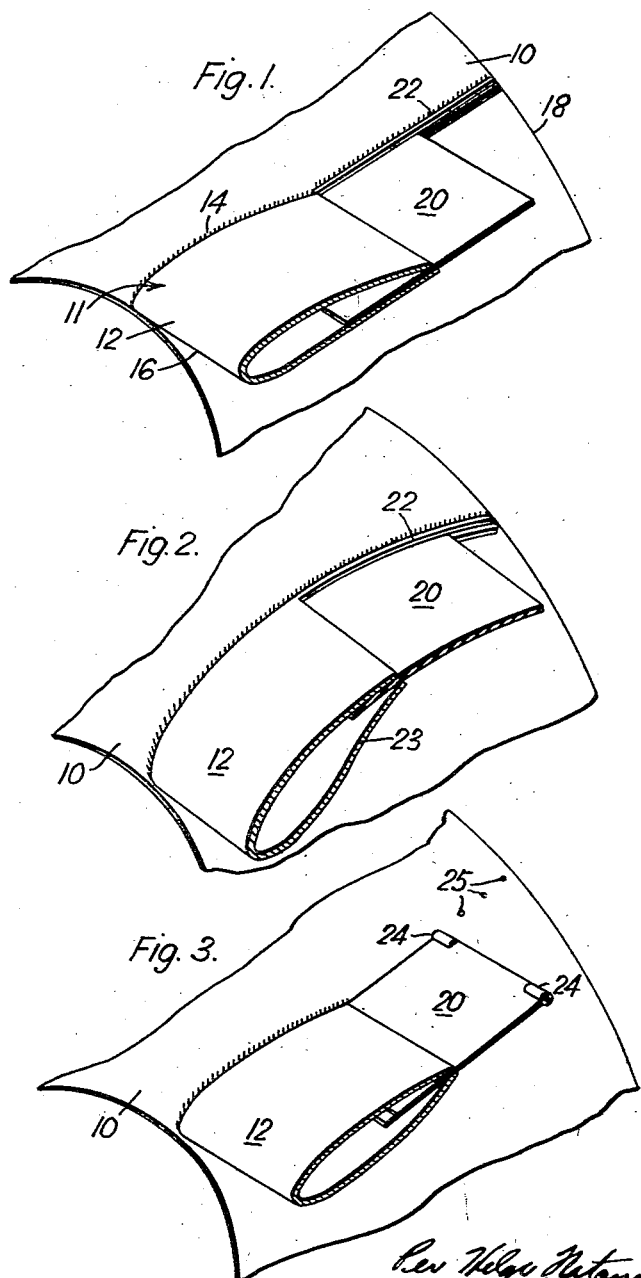

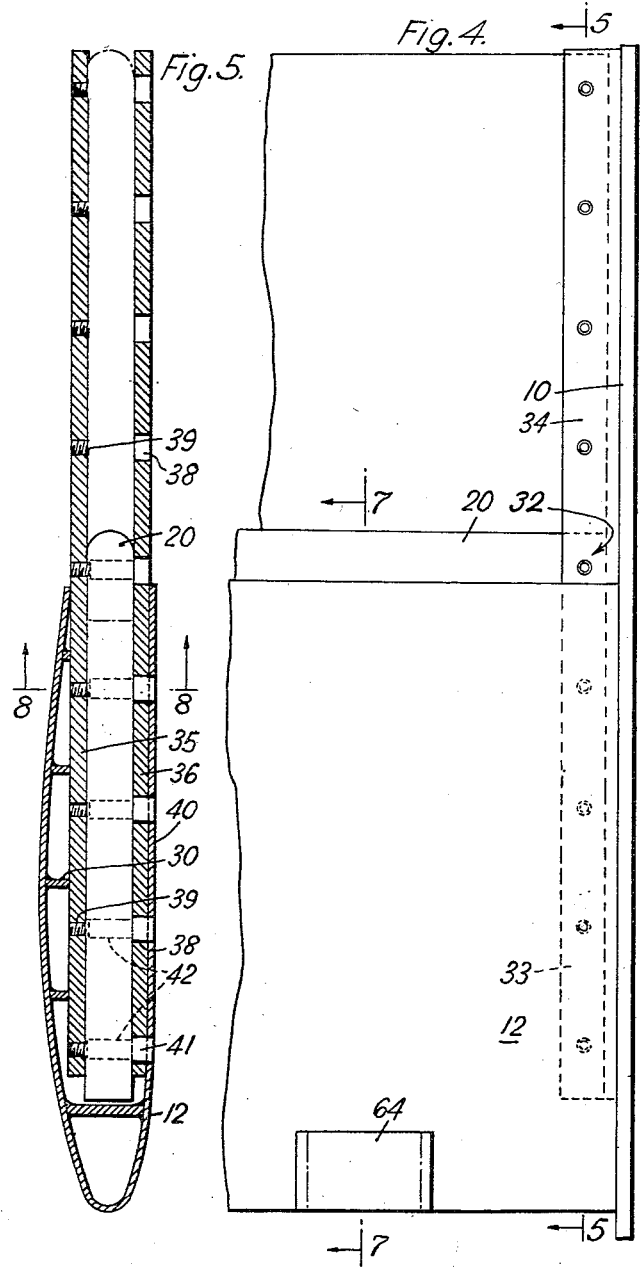

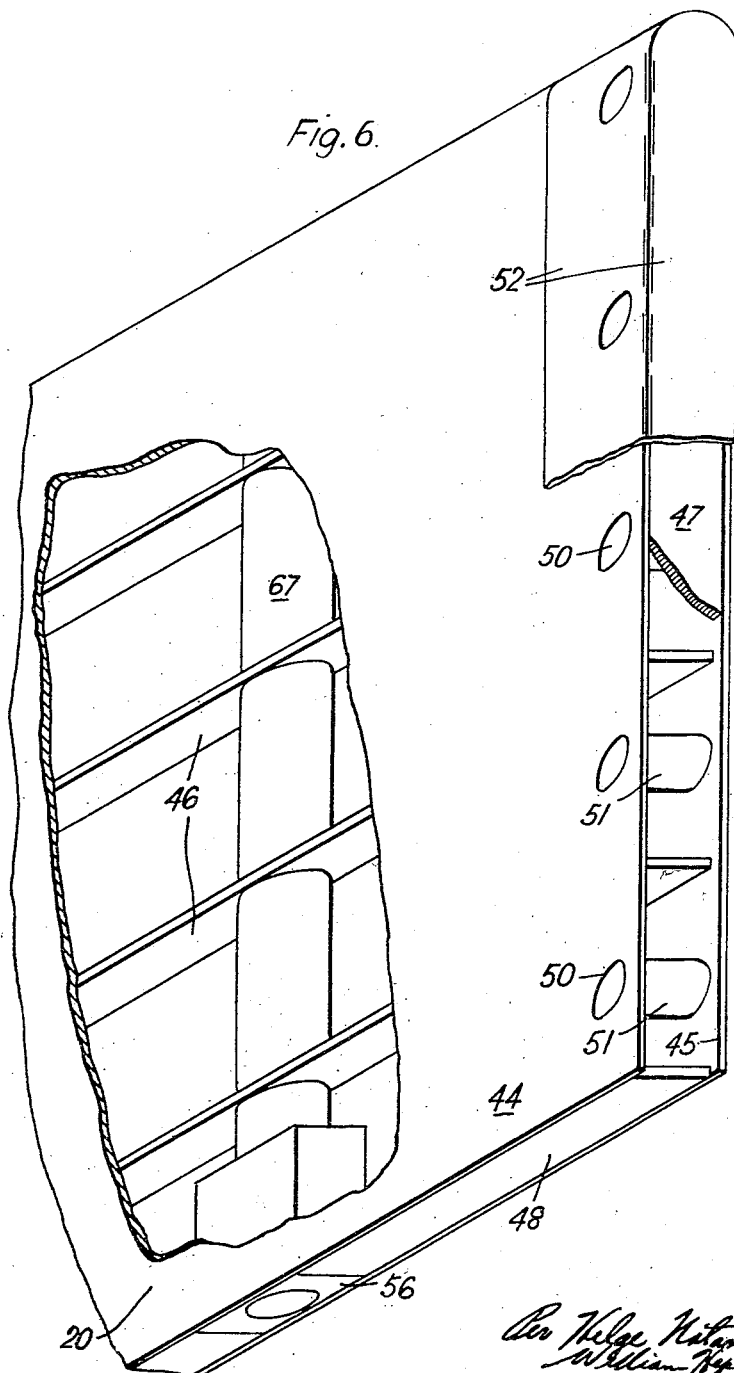

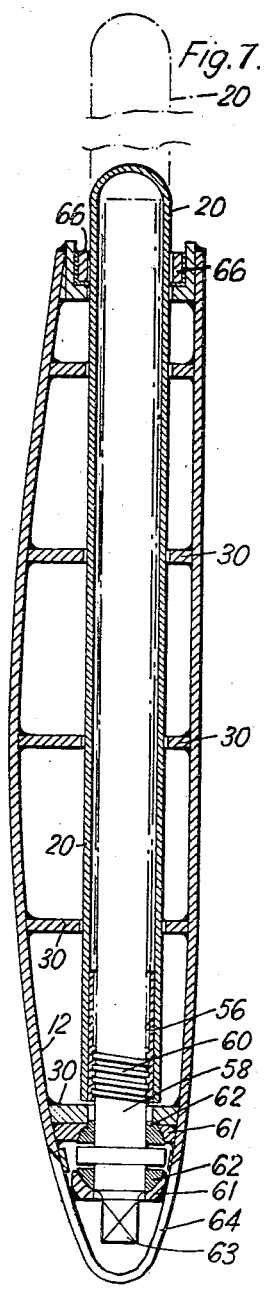

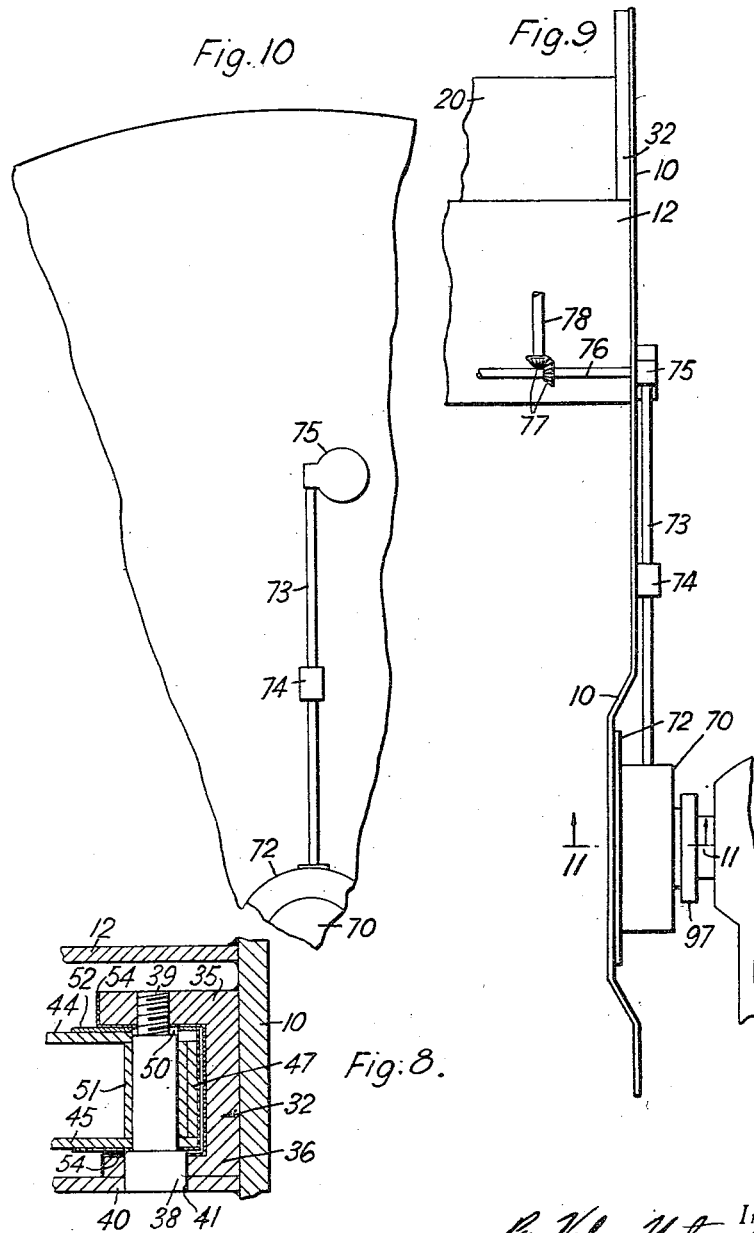

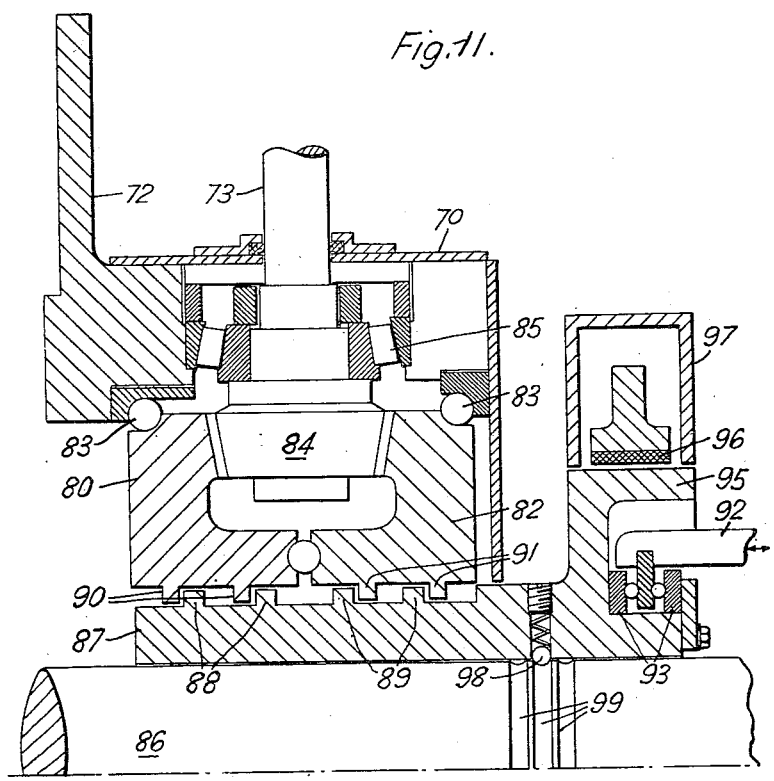

2,774,308

RADIAL FLOW IMPELLERS

Per Helge Natanael Ulander, London, England, and William Hepples Johnson, Glasgow, Scotland Application April 22, 1952, Serial No. 283,534

5 Claims. (Cl. 103—97)

This invention relates to radial flow impellers for fluids, such as fans or pumps.

In such impellers both the volumetric output and the energy input to the impelled fluid are dependent on the radial depth of the blade and on the angle of inclination of the blade both at the inlet and at the outlet. Further, the characteristics of the impeller will vary according to whether the blades are radially disposed or are forwardly curved or backwardly curved relatively to the direction of rotation. Impellers of this kind are, therefore, designed to provide a definite predetermined output and energy input to the fluid which remain substantially constant under the operating conditions of the impeller.

The primary object of this invention is to provide a method of and means for varying the total head and volumetric output of a radial flow impeller.

Another object of the invention is to provide a radial flow impeller wherein the hydraulic efficiency remains approximately constant over a wide range of operating conditions.

A further object of the invention is to provide a radial flow impeller wherein the radial depth of the impeller blades may be varied between predetermined minimum and maximum values.

A still further object of the invention is to provide a radial flow impeller with means to vary the radial depth of the blades while the impeller is in operation.

For a better understanding of the nature of these and other objects and the manner in which they may be attained reference may be had to the following portion of this specification in conjunction with the accompanying drawings forming a part hereof, and in which:

Figure 1 shows diagrammatically in longitudinal section one form of impeller blade constructed according to the invention.

Figures 2 and 3 each show a corresponding section of a modified form of blade.

Figure 4 shows in diagrammatic side elevation a practical construction of an impeller blade in accordance with the invention.

Figure 5 is a section on the line 5—5 of Figure 4.

Figure 6 shows in perspective view, with the outer surface partly broken away, a form of retractable blade tail.

Figure 7 is a longitudinal section on the line 7—7 of Figure 4 on a larger scale showing a screw mechanism for displacing the retractable tail.

Figure 8 is a cross-section on the line 8—8 of Figure 5.

Figure 9 shows in diagrammatic side elevation an impeller blade having a retractable tail and actuating means for displacing the tail while the impeller is rotating.

Figure 10 is a front elevation of the actuating means shown in Figure 9.

Figure 11 is an axial section on the line 11—11 of Figure 9 on an enlarged scale.

Referring to the drawings, Figure 1 shows by way of example a fragmentary view of a radial flow impeller having a back plate 10 and an impeller blade 11 disposed substantially radially of the axis of rotation. The impeller blade 11 comprises a fixed nose 12 which is rigidly secured to the back plate 10 by welding or the like as shown at 14 and at its other end to a shroud plate (not shown). The fixed nose 12 is shown of aerofoil profile and extends only part of the radial distance from its inlet edge 16 to the outer perimeter 18 of the back plate 10. Disposed within the hollow nose 12 is a retractable tail element 20 which may be disposed wholly within the fixed nose 12 or in its withdrawn position may extend substantially to the outer perimeter of the back plate 10. Guides 22 are provided on the back plate and also on the shroud plate (not shown) to maintain the tail 20 in its desired position. Suitable fixing means as hereinafter described are provided for holding the displaceable tail 20 in its withdrawn position.

It will thus be understood that each blade of the impeller would be similarly formed as to consist of a rigidly fixed nose member and a movable tail member adapted to be displaced outwardly of the nose member to extend the blade or retracted from its extended position to decrease the blade depth. The minimum blade depth obtainable would thus be equivalent to the rigidly fixed nose 12. This portion 12 should be so designed as to provide sufficient strength and rigidity to the impeller since no structural benefit would normally be obtained from the retractable tail member 20.

With a correctly designed impeller wheel having its blades constructed as described with reference to Figure 1 the hydraulic efficiency would remain approximately constant over a wide range of operation, that is to say with the radial depth of the blades varying between predetermined minimum and maximum values.

Figure 2 shows a modified form of blade comprising a fixed nose 12 and a retractable tail 20 movable in guides 22 wherein the tail member is of curved profile and is slidable within the hollow fixed nose piece 12. The shape of the movable tail member 20 may if desired be such as to vary the entire characteristics of the impeller when withdrawn into an extended position. For example, the retractable tail member 20 together with its guides 22 may be so shaped as to conform to an extension of the lower face 23 of the fixed member 12, that is to say an impeller blade having its fixed nose 12 of aerofoil profile and with its median plane disposed substantially radially may contain a movable tail piece which is forwardly or rearwardly curved according to the desired impeller characteristics.

Figure 3 shows a further form of blade having a fixed nose 12 rigidly secured to a back plate 10 and provided with a radially extending tail piece 20 which at opposite ends of its outer edge is provided with socket members 24. On the back plate 10 and the shroud member (not shown) are provided a plurality of apertures 25 through which pass locking pins engaging in the socket members 24. The apertures 25 and the locking pins extending therethrough and engaging the sockets 24 thus form guides for the outer end of the movable tail piece 20.

Figures 4 to 7 show a practical construction of an impeller blade as shown diagrammatically in Figure 1. The fixed nose 12 is rigidly secured to the back plate 10 and to the shroud plate (not shown) and comprises a nose piece of aerofoil profile which is provided with stiffening ribs 30. Rigidly secured to the back plate 10 and to the shroud plate (not shown) are guide members denoted generally at 32 which have a portion 33 extending within the fixed nose 12 and a further portion 34 projecting radially beyond the outer end of the nose 12. The guide members 32 as shown in Fig. 8 consist of angle irons or the like 35, 36 which form a slideway adjacent the back plate and shroud plate intended to receive and guide the edges of the movable tail piece 20. At spaced intervals along the guides 35, 36 are formed apertures 38 and 39 respectively while in the surface element 40 of the nose piece 12 are formed corresponding apertures 41. These apertures are intended to receive locking pins 42 which pass through the edge portions of the retractable tail piece shown more particularly in Figure 8.

The retractable tail piece consists of two plate members 44, 45 spaced apart to form a hollow blade structure by means of reinforcing ribs 46, the edges of the spaced plates 44, 45 being closed by means of plates 47, 48 as shown in Figure 6. Each of the plates 44, 45 is apertured to allow the passage of the locking pins 42, the apertures in the plate 44 being shown at 50. Between the plates 44, 45 in alignment with the apertures therein are fitted tubular struts 51 rigidly secured to the plates 44, 45 and through which the pins 42 pass.

In the case where the impeller is used for moving gases having a corrosive action on the blades it is preferable to coat the surfaces at each edge of the retractable tail 20 and the inner surfaces of the guides 35, 36 within which the edges of the tail member 20 slide with a layer which is resistant to corrosion. Such a layer is indicated in Figure 6 by 52 and the corresponding layer on the guide members 35, 36 is indicated by 54.

In order to move the retractable tail 20 longitudinally of the fixed nose 12 so as to vary the depth of the blade the tail is provided with an internally threaded nut 56 adapted to receive an externally threaded screw mounted in the fixed nose piece 12. As shown in Figure 7, the screw 58 provided with external threads 60 is mounted for rotation adjacent the inlet edge of the fixed nose 12 by means of a double thrust bearing 61 rigidly secured as by welding to the fixed nose 12 and corresponding part-spherical rings 62 rigidly secured to the screw 58. By this construction the screw 58 is self-aligning.

It will thus be understood that rotation of the screw 58, for example, by the application of a suitable tool to the square end 63 and the engagement of the threads 60 with internal nut 56 on the tail member 20 will cause longitudinal displacement of said tail member 20 in one or other direction according to the direction of rotation. The simple thrust bearing 61, 62 assists in reducing the mechanical effort required to operate the tail. To allow access to the member 63, the fixed nose 12 is provided with a removable access door 64 shown in Figures 4 and 7.

At the outer end of the fixed nose 12 suitable seals 66 are provided between the fixed nose 12 and the adjustable tail 20. If desired, the tail member 20 may be provided with a shroud tube 67 adapted to receive the screw 58. The same generally construction of tail piece 20 and guides therefor as well as the actuating screw mechanism would be applicable in the case where adjustment of the tail member 20 is required while the impeller is rotating.

In operation when the impeller is at rest the locking pins 42 would be removed and the retractable tail moved outwardly or inwardly relatively to the fixed nose 12 by means of the screw mechanism and when the desired position of adjustment has been reached the locking pins are replaced through the guide members 35, 36 and the tail member 20.

Figures 9 and 11 show one means for actuating the retractable tail while the impeller is rotating. Figure 9 shows in side elevation an impeller blade secured to a back plate 10. The blade comprises a fixed nose member 12 and a retractable tail member 20 and guide members 32 as previously described. Mounted in a housing 70 secured by a flange 72 to the back plate 10 is an actuating mechanism shown more particularly in Figure 11. This mechanism is connected by means of a rotatable drive shaft 73 carried in suitable bearings 74 to a worm gear 75. The worm wheel is mounted on a transverse shaft 76 connected by means of bevel gearing 77 to an actuating screw 78 corresponding to the screw 58 described with reference to Figures 4 to 7.

The mechanism shown in Figure 13 comprises a pair of large bevel gears 80, 82 rotatably mounted by means of ball races 83 in the inner casing 70 and meshing with a number of smaller bevel gears 84, the number of which depends on the number of blades to be adjusted. Each smaller bevel gear 84 is mounted on the drive shaft 73 and is rotatably supported within the housing 40 by means of a roller bearing 85.

Mounted on the fan shaft 86 for rotation relatively thereto is an annular slide 87 provided on its outer face with dog clutches 88, 89 while the bevel gears 80, 82 are provided correspondingly on their inner peripheries with cooperating members 90, 91 of the dog clutches 88, 89. The annular slide is displaceable longitudinally of the shaft 86 through the intermediary of a slide link 92 actuating the slide 87 through a double thrust bearing 93. The slide 87 is also provided with a brake drum 95 adapted to be engaged by a brake shoe 96 disposed within a casing 97. A spring-urged ball stop 98 is provided adapted to engage with one or other of three annular grooves 99 formed in the fan shaft 86 so as to hold the slide 87 in one or other of its adjusted positions.

Under normal operating conditions wherein the impeller operates under constant duty conditions the slide 87 will be in its central neutral position as illustrated in Figure 13. In this position the slide 87 is free to rotate with the fan shaft 86 while the bevel gears 80, 82 would have no relative movement and as a result each small bevel gear 84 meshing with the bevel gears 80, 82 would have no rotation about the axis of said bevel gear 84. Movement of the slide 87 to the left through the actuating link 92 and thrust bearing 93, which link may be operated mechanically or electrically or hydraulically would cause the dog clutch members 88, 90 to engage, in which case the bevel gear 80 and the slide 87 would rotate as a unit. If now the brake shoe 96 is applied to the brake drum 95 preferably by the same actuating means, mechanical, electrical or hydraulic as for the actuating link 92, the rotational speed of the slide 87 and the bevel gear 80 is reduced so that there is a difference in the rotational speeds of the bevel gears 80 and 82, thus causing rotation of each bevel gear 84 about its own axis.

Rotation of bevel gears 84 rotates the respective drive shafts 73 which through the worm gear 75 rotates the shaft 76 and through the bevel 77 will rotate the actuating screw 88 of the retractable tail 20.

On the retractable tail 20 reaching the desired setting position the brake shoe 96 would be released, thus allowing the slide 87 and the bevel gear 80 to rotate at the same speed as that of the fan shaft 86 and thus stop further rotation of the bevel gears 84 about their own axes. The slide 87 would then be returned to its central neutral position and held therein by the ball stop 98.

Obviously the rotation of the shafts 73 in the opposite direction is produced by moving the slide 87 to the right of the position illustrated, the drive being produced in the manner described above through the slide 87 and bevel gear 82, together with the brake elements 96, 97 to cause bevel gear 84 to rotate in the opposite direction about its own axis.

It is to be understood that the invention is applicable to any known type of blade whether comprising an aerofoil profile either symmetrical or cambered or whether consisting of a single plate blade either flat or cambered.

What we claim is:

1. A centrifugal impeller comprising a back plate, an annular shroud plate disposed co-axially with and spaced from said back plate, a plurality of blades each backwardly inclined with respect to the direction of rotation of said impeller, each blade including a nose portion and a tail portion, said nose portion comprising a rigid, hollow structure of airfoil cross section extending between said back plate and said shroud plate and fixed thereto, the trailing edge of said nose portion being open, guides fixed to said back plate and said shroud plate, said guides being disposed within said nose portion at each end thereof and extending rearwardly through said open trailing edge, said tail portion being of rigid construction and of substantially the same length and width as said nose portion and slidably received on said guides for movement from a retracted position substantially completely housed within said nose portion to an extended position to provide a blade having a width substantially twice the width of said nose portion and means to secure said tail portion in adjusted position.

2. A centrifugal impeller as defined in claim 1 in which said securing means comprises a plurality of spaced apertures in said guides, apertures in said tail portion movable into alignment with selected apertures in said guides and pins removably disposed in said aligned apertures.

3. A centrifugal impeller as defined in claim 1, including actuating means housed within said nose portion for moving said tail portion on said guides relative to said nose portion.

4. A centrifugal impeller as defined in claim 3, in which said actuating means comprises a screw rotatably mounted in said nose portion and fixed against axial movement and a nut secured to said tail portion and threadedly engaging said screw.

5. A centrifugal impeller as defined in claim 4, including drive means for rotating said screw during rotation of said impeller.

References Cited in the file of this patent

UNITED STATES PATENTS

| | | |
|---|---|---|
| 219,308 | Rice | Sept. 2, 1879 |
| 289,436 | Moran | Dec. 4, 1883 |
| 1,250,681 | Sheldon | Dec. 18, 1917 |
| 2,074,807 | Reed | Mar. 23, 1937 |
| 2,145,413 | Belfield | Jan. 31, 1939 |
| 2,189,252 | Reggio | Feb. 6, 1940 |
| 2,423,095 | Gibson | July 1, 1947 |

FOREIGN PATENTS

| | | |
|---|---|---|
| 406,336 | Germany | Nov. 21, 1924 |